US010719303B2

(12) United States Patent
Gasselin de Richebourg et al.

(10) Patent No.: US 10,719,303 B2
(45) Date of Patent: Jul. 21, 2020

(54) GRAPHICS ENGINE AND ENVIRONMENT FOR ENCAPSULATING GRAPHICS LIBRARIES AND HARDWARE

(71) Applicant: Apple Inc., Cupertino, CA (US)

(72) Inventors: Jacques P. Gasselin de Richebourg, Sunnyvale, CA (US); Domenico P. Porcino, Novato, CA (US); Timothy R. Oriol, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 12 days.

(21) Appl. No.: 15/081,451

(22) Filed: Mar. 25, 2016

(65) Prior Publication Data

US 2016/0357532 A1 Dec. 8, 2016

Related U.S. Application Data

(60) Provisional application No. 62/172,114, filed on Jun. 7, 2015.

(51) Int. Cl.
G06F 9/44 (2018.01)
G06F 8/51 (2018.01)
(Continued)

(52) U.S. Cl.
CPC ............... G06F 8/51 (2013.01); G06F 3/14 (2013.01); G06F 8/427 (2013.01); G06F 8/447 (2013.01);
(Continued)

(58) Field of Classification Search
CPC .............. G06F 8/41; G06F 8/45; G06F 8/443
See application file for complete search history.

(56) References Cited

U.S. PATENT DOCUMENTS 5,675,773 A * 10/1997 Devic ................. G06F 12/0875
345/522
7,847,800 B2 * 12/2010 Harper ..................... G06T 1/20
345/502

(Continued)

FOREIGN PATENT DOCUMENTS

EP 1070301 A1 1/2001

OTHER PUBLICATIONS

Helge Rhodin, "A PTX Code Generator for LLVM," Oct. 29, 2010 (Oct. 29, 2010), pp. 1-63, XP055208570, Saarbrucken, Germany, Retrieved from the Internet: URL: http://compilers.cs.uni-saarland.de/publications/theses/rhodin_bsc.pdf [retrieved on Aug. 19, 2015].

(Continued)

Primary Examiner — Duy Khuong T Nguyen
(74) Attorney, Agent, or Firm — Blank Rome LLP

(57) ABSTRACT

The disclosure pertains to the operation of graphics systems and to a variety of architectures for design and/or operation of a graphics system spanning from the output of an application program and extending to the presentation of visual content in the form of pixels or otherwise. In general, many embodiments of the invention envision the processing of graphics programming according to an on-the-fly decision made regarding how best to use the specific available hardware and software. In some embodiments, a software arrangement may be used to evaluate the specific system hardware and software capabilities, then make a decision regarding what is the best graphics programming path to follow for any particular graphics request. The decision regarding the best path may be made after evaluating the hardware and software alternatives for the path in view of the particulars of the graphics program to be processed.

20 Claims, 8 Drawing Sheets

(51) Int. Cl.
*G06T 15/80* (2011.01)
*G06T 1/20* (2006.01)
*G06F 8/41* (2018.01)
*G06F 3/14* (2006.01)
*G06F 9/4401* (2018.01)

(52) U.S. Cl.
CPC .............. *G06F 9/4411* (2013.01); *G06T 1/20* (2013.01); *G06T 15/80* (2013.01); *G06T 2200/04* (2013.01); *G06T 2215/12* (2013.01)

(56) References Cited

U.S. PATENT DOCUMENTS

| | | | | |
|---|---|---|---|---|
| 8,006,236 | B1* | 8/2011 | Kilgard | G06F 8/443 345/419 |
| 8,042,097 | B2 | 10/2011 | Aridor | |
| 8,982,138 | B2 | 3/2015 | Mathur | |
| 9,679,346 | B2* | 6/2017 | Begeman et al. | G06T 15/005 |
| 9,740,464 | B2* | 8/2017 | Munshi | G06F 8/47 |
| 2007/0067761 | A1 | 3/2007 | Ogilvie | |
| 2007/0234284 | A1* | 10/2007 | Tanner | G06F 9/451 717/109 |
| 2009/0122062 | A1* | 5/2009 | Kilpatrick | G06F 8/51 345/426 |
| 2009/0217252 | A1* | 8/2009 | Aronson | G06F 8/4434 717/159 |
| 2012/0147011 | A1* | 6/2012 | Harper | G06T 1/20 345/440 |
| 2013/0141443 | A1* | 6/2013 | Schmit | G06F 8/41 345/505 |
| 2013/0176322 | A1* | 7/2013 | Bakalash | G06T 15/005 345/522 |
| 2013/0198494 | A1* | 8/2013 | Grover | G06F 8/53 712/226 |
| 2014/0184622 | A1* | 7/2014 | Xia | G06T 1/20 345/522 |
| 2014/0258997 | A1* | 9/2014 | Lim | G06F 8/443 717/151 |
| 2014/0333641 | A1 | 11/2014 | Dodge | |
| 2015/0002521 | A1* | 1/2015 | McCarthy | G06T 1/20 345/522 |
| 2016/0011857 | A1* | 1/2016 | Grover | G06F 9/4552 717/148 |
| 2017/0147299 | A1* | 5/2017 | Lai | G06F 9/45525 |

OTHER PUBLICATIONS

International Search Report and Written Opinion dated Sep. 30, 2016 in PCT Application No. PCT/US2016/036060.

* cited by examiner

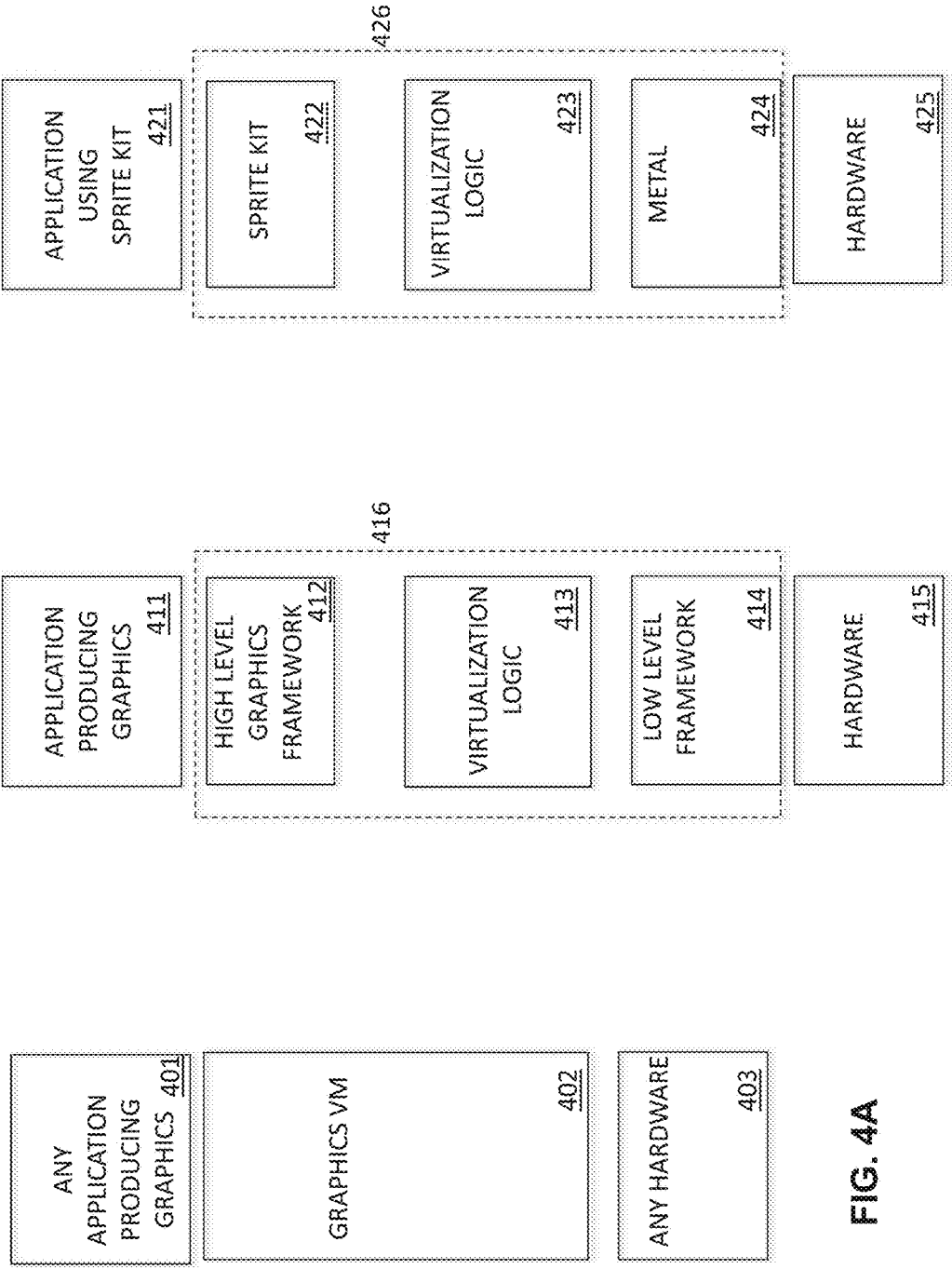

| 500 | 510 | 520 | 530 | 540 | 550 |
|---|---|---|---|---|---|

| APPLICATION USING SPRITE KIT 501 | APPLICATION USING SCENE KIT 502 | APPLICATION USING CORE ANIMATION 503 | APPLICATION USING CORE GRAPHICS 504 | APPLICATION PRODUCING ANY GRAPHICS 505 |
|---|---|---|---|---|
| SPRITE KIT 511 | SCENE KIT 512 | CORE ANIMATION 513 | CORE GRAPHICS 514 | HIGH LEVEL GRAPHICS FRAMEWORK 515 |

GRAPHICS VIRTUALIZATION LOGIC 521

| OPEN GL 531 | METAL 532 | SOFTWARE RAYTRACER 533 | PURE SOFTWARE RASTERIZER 534 | LOW LEVEL FRAMEWORK COMPATIBILITY 535 |
|---|---|---|---|---|
| HARDWARE 1 541 | HARDWARE 2 542 | HARDWARE 3 543 | OTHER FORMS OF DESTINATION 544 | |

DISPLAYS OR OTHER PRESENTATION DEVICES 551

FIG. 5

GRAPHICS ENGINE AND ENVIRONMENT FOR ENCAPSULATING GRAPHICS LIBRARIES AND HARDWARE

CROSS-REFERENCE TO RELATED APPLICATIONS

This applications claims priority to U.S. Provisional Patent Application Number 62/172,114, entitled "Graphics Engine And Environment For Encapsulating Graphics Libraries And Hardwares," filed on Jun. 7, 2015, which is hereby incorporated by reference in its entirety.

BACKGROUND

The inventions disclosed herein relate to the field of graphics processing and, without limitation, the software manipulations that bring graphics requests from an application to the rendering or presenting hardware.

Graphics processing units (GPUs) have become important for processing data-parallel graphics tasks. Developers now recognize that non-graphics data-parallel tasks can also be handled by GPUs, taking advantage of their massive parallel capabilities. Vendors and standards organizations have created application programming interfaces (APIs) that make graphics data-parallel tasks easier to program because of the high level of developer programming interaction. However, there are also low-level APIs (or libraries/frameworks etc.) that reside closer to hardware and are generally employed by applying the output of the higher-level APIs. In other words, the higher-level APIs generally simply prepare program code for application to the lower-level APIs.

Given the diversification of graphics programming techniques and the ever-changing capabilities of graphics hardware, every graphics request run through a standard path from the application to the hardware may not be using the very best resources available to reach execution as quickly and efficiently as possible. In addition, due to the relatively fixed and standard nature of the available frameworks, the path of a graphics request may not consider other system status issues or contextual information, which, if known, might influence the choice of path for any particular graphics request.

SUMMARY

This disclosure relates generally to the field of computer programming. More particularly, but not by way of limitation, it relates to an efficient manipulation of programming language and the flexible re-configuration of the portion of the graphics pipeline between the application and the graphics hardware. More particularly, in some embodiments, graphics requests generated by an application program are captured by a virtual logic mechanism that evaluates the nature of the request and develops on optimum path to rendering based upon the available libraries/frameworks and/or hardware in the system. The virtual logic may incorporate or work in combination with high-level frameworks (e.g., Apple Inc.'s Sprite Kit) and low-level graphics libraries (e.g., OpenGL).

In at least one embodiment, a virtualizing logic mechanism is built into high-level graphics frameworks where it evaluates graphics requests and determines the best hardware and low-level library to use on a per-request basis. In other embodiments, the virtualizing mechanism sits between a system's high-level frameworks and low-level libraries, where it can evaluate system status, available resources and the nature of the graphics request, and then dependently customize the graphics backend for every request. The customization may involve a choice of a low-level library, a choice of a particular hardware processing resource, and many other options.

The architecture implied by these embodiments provides a level of indirection between an application's use of graphics and the way the graphics are actually rendered. Therefore, the aforementioned embodiments allow an application program (and its developer) to disregard the graphics backend. This has many advantages. For example, by managing the graphics backend independently, any improvements made in the backend may accrue to application programs without any change to the application code. Thus, if there is new improved hardware and improved low-level libraries to take advantage of the hardware, under some inventive embodiments, even old applications might take advantage of new features.

In some embodiments of the disclosure, the software architecture facilitates both the desirable indirection discussed above as well as the addition of new features and backend resources. In many of these embodiments, source code language transformation and simplification are achieved through manipulation of an abstract syntax tree ("AST"). In one or more embodiments, an original graphics program is represented in an AST. The AST is then manipulated to transform the programming language into a universal intermediary form. After a decision is made regarding the backend path for a particular program, the AST may be further manipulated to adjust to a new chosen language (e.g., low-level library) and/or chosen hardware.

Some embodiments disclosed herein relate to the flexible and efficient management of graphics code so that a backend portion of the graphics pipeline may be dynamically altered to the situation.

BRIEF DESCRIPTION OF THE DRAWINGS

FIGS. 4A, 4B, and 4C show illustrative system architectures.

FIG. 5 shows illustrative system architecture.

DETAILED DESCRIPTION

Figure 1:
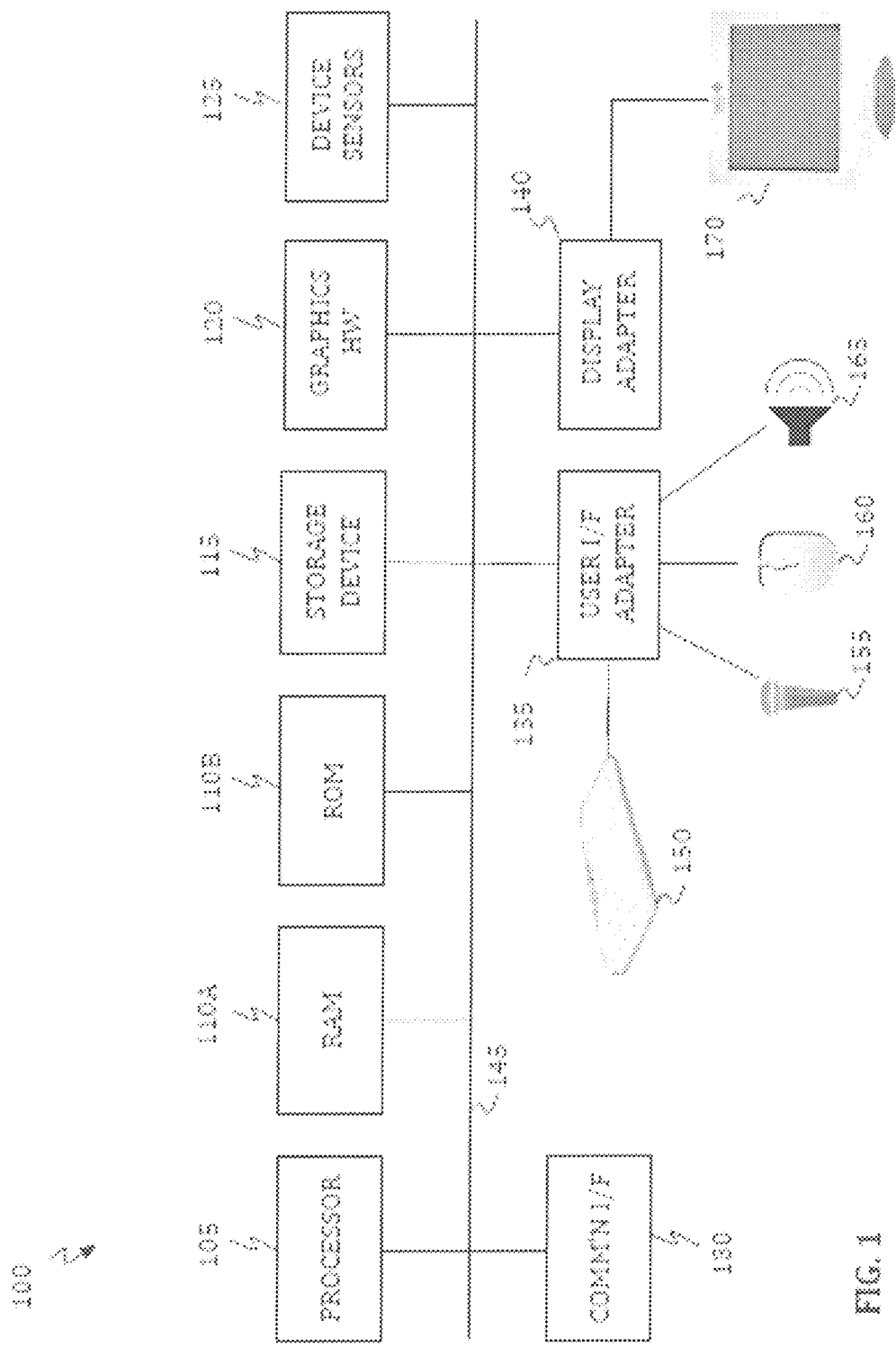
FIG. 1 shows a representative computer node that may be used, for example, as an end-user machine or a developer machine.

This disclosure pertains to systems, methods, and computer readable media to improve the operation of graphics systems. It also pertains to a variety of architectures for design and/or operation of a graphics system starting with an application program and extending to the presentation of visual content in the form of pixels or otherwise. In general, many embodiments of the invention envision the processing of graphics programming according to an on-the-fly decision made regarding how to best use the specifically available hardware and software. In some embodiments, a software arrangement is used to evaluate the specific system hardware and software capabilities and then make a decision regarding the best graphics programming path to follow. The decision regarding the best path may be made after evaluating the hardware and/or software alternatives for the path in view of the particulars of the graphics program to be processed. The aforementioned software arrangement may be used to insulate application programs from the entire graphics backend, yielding significant benefits. For example, the graphics back end may be revised to account for new hardware or graphics libraries available in a system so that legacy programs (written and unchanged prior to the availability of the new hardware and/or libraries) may take advantage of the new back end capabilities. This saves time for developers and allows end-users to instantly access the benefits of new graphics hardware and software platforms without waiting for application updates.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation are described. Moreover, the language used in this disclosure has been principally selected for readability and instructional purposes, and may not have been selected to delineate or circumscribe the inventive subject matter, leaving resorting to the claims as a potential necessity to determine such inventive subject matter. Reference in this disclosure to "one embodiment" or to "an embodiment" or "embodiments" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve the developers' specific goals (e.g., compliance with system- and business-related constraints), and that these goals may vary from one implementation to another. It will also be appreciated that such development efforts might be complex and time-consuming, but would nonetheless be a routine undertaking for those having the benefit of this disclosure and being of ordinary skill in the design and implementation of user interface and response systems and/or gesture identification processing systems.

Exemplary Hardware and Software

The inventive embodiments described herein may have implication and use in and with respect to all types of devices, including single- and multi-processor computing systems and vertical devices (e.g., cameras, gaming systems, appliances, etc.) that incorporate single- or multi-processing computing systems. The discussion herein is made with reference to a common computing configuration that may be discussed as a software development system or an end user system. This common computing configuration may have a CPU resource including one or more microprocessors. This discussion is only for illustration regarding sample embodiments and is not intended to confine the application of the invention to the disclosed hardware. Other systems having other known or common hardware configurations (now or in the future) are fully contemplated and expected. With that caveat, a typical hardware and software operating environment is discussed below. The hardware configuration may be found, for example, in a server, a workstation, a laptop, a tablet, a desktop computer, a gaming platform (whether or not portable), a television, an entertainment system, a smart phone, a phone, or any other computing device, whether mobile or stationary.

Referring to FIG. 1, the disclosed embodiments may be performed by representative computer system 100. For example the representative computer system may act as a software development platform or an end-user device. System 100 may be embodied in any type of device such as a general purpose computer system, a television, a set top box, a media player, a multi-media entertainment system, an image processing workstation, a hand-held device, or any device that may be coupled with or may incorporate display or presentation devices as discussed herein. Computer system 100 may include one or more processors 105, memory 110 (110A and 110B), one or more storage devices 115, and graphics hardware 120. Computer system 100 may also have device sensors 125, which may include one or more of: depth sensors (such as a depth camera), 3D depth sensor(s), imaging devices (such as a fixed and/or video-capable image capture unit), RGB sensors, proximity sensors, ambient light sensors, accelerometers, gyroscopes, any type of still or video camera, LIDAR devices, SONAR devices, microphones, CCDs (or other image sensors), infrared sensors, thermometers, etc. These and other sensors may work in combination with one or more GPUs, DSPs or conventional microprocessors along with appropriate programming so the sensor outputs may be properly interpreted and/or combined and interpreted.

Returning to FIG. 1, system 100 may also include communication interface 130, user interface adapter 135, and display adapter 140—all of which may be coupled via system bus or backplane 145. Memory 110 may include one or more different types of media (e.g., solid-state, DRAM, optical, magnetic, etc.) used by processor 105 and graphics hardware 120. For example, memory 110 may include memory cache, read-only memory (ROM), and/or random access memory (RAM). Storage 115 may include one or more non-transitory storage media including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 110 and storage 115 may be used to retain media (e.g., audio, image, and video files), preference information, device profile information, computer program instructions organized into one or more modules and written in any desired computer programming language, and any other suitable data. When executed by processor 105 and/or graphics hardware 120, such computer program code may implement one or more of the methods or processes described herein. Communication interface 130 may include semiconductor-based circuits and be used to connect computer system 100 to one or more networks. Illustrative networks include, but are not limited to: a local network, such as a USB network; a business's local area network; and a wide area network such as the Internet and may use any suitable technology (e.g., wired or wireless). Communications technologies that may be implemented include cell-based communications (e.g., LTE, CDMA, GSM, HSDPA, etc.) or other communications (Ethernet, WiFi, Bluetooth, USB, Thunderbolt, Firewire, etc.). User interface adapter 135 may be used to connect keyboard 150, microphone 155, pointer device 160, speaker 165, and other user interface devices such as a touchpad and/or a touch screen (not shown). Display adapter 140 may be used to connect one or more display units 170.

Processor 105 may execute instructions necessary to carry out or control the operation of many functions performed by system 100 (e.g., evaluation, transformation, and compilation of graphics programs). Processor 105 may, for instance, drive display 170 and receive user input from user interface adapter 135 or any other user interfaces embodied by a system. User interface 135, for example, can take a variety of forms, such as a button, a keypad, a dial, a click wheel, a keyboard, a display screen, and/or a touch screen. Processor 105 may be any type of computing device such as one or more microprocessors working alone or in combination with GPUs, DSPs, system-on-chip devices such as those found in mobile devices. Processor 105 may include one or more dedicated GPUs or graphics subsystems that accept program instructions to create or alter display information such as pixels. In addition, processor 105 may be based on reduced instruction-set computer (RISC) or complex instruction-set computer (CISC) architectures or any other suitable architecture and may include one or more processing cores. Graphics hardware 120 may be special purpose computational hardware for processing graphics and/or assisting processor 105 in performing computational tasks. In some embodiments, graphics hardware 120 may include CPU-integrated graphics and/or one or more programmable GPUs. System 100 (implementing one or more embodiments discussed herein) can provide the means for one or more users to control the same system (e.g., system 100) or another system (e.g., another computer or entertainment system) through user activity, which may include natural activity and/or predetermined gestures such as hand gestures.

Various embodiments of the invention may employ sensors, such as cameras. Cameras and like sensor systems may include auto-focus systems to accurately capture video or image data ultimately used to interpret user intent or commands. Since the motion of the user may be based upon subtle activity in small regions in the captured images (e.g., hands, fingers, face, mouth, brow etc.) the autofocus system may be used to separately focus on multiple regions of the image in order to access better information.

Returning to FIG. 1, sensors 125 may capture contextual and/or environmental phenomena such as time; location information; the status of the device with respect to light, gravity, and the magnetic north; and even still and video images. In addition, network-accessible information such as weather information may also be used as part of the context. All captured contextual and environmental phenomena may be used to provide context to user activity or information about user activity. For example, in accessing a gesture or the expression or emotion of a user, the contextual information may be used as part of the analysis. If the time is 3:00 a.m., it is more likely that a user's face indicates sleepiness than sadness.

Output from the sensors 125 may be processed, at least in part, by processors 105 and/or graphics hardware 120, and/or a dedicated image processing unit incorporated within or without system 100. Information so captured may be stored in memory 110 and/or storage 115 and/or any storage accessible on an attached network. Memory 110 may include one or more different types of media used by processor 105, graphics hardware 120, and sensors 125 to perform device functions. Storage 115 may store data such as media (e.g., audio, image, and video files); metadata for media; computer program instructions; and other software; including database applications (e.g., a database storing avatar frames), preference information, device profile information, and any other suitable data. Memory 110 and storage 115 may be used to retain computer program instructions or code organized into one or more modules in either compiled form or written in any desired computer programming language. When executed by, for example, processor 105, such computer program code may implement one or more of the acts or functions described herein (e.g., interpreting and responding to user activity including commands and/or gestures).

Figure 2:
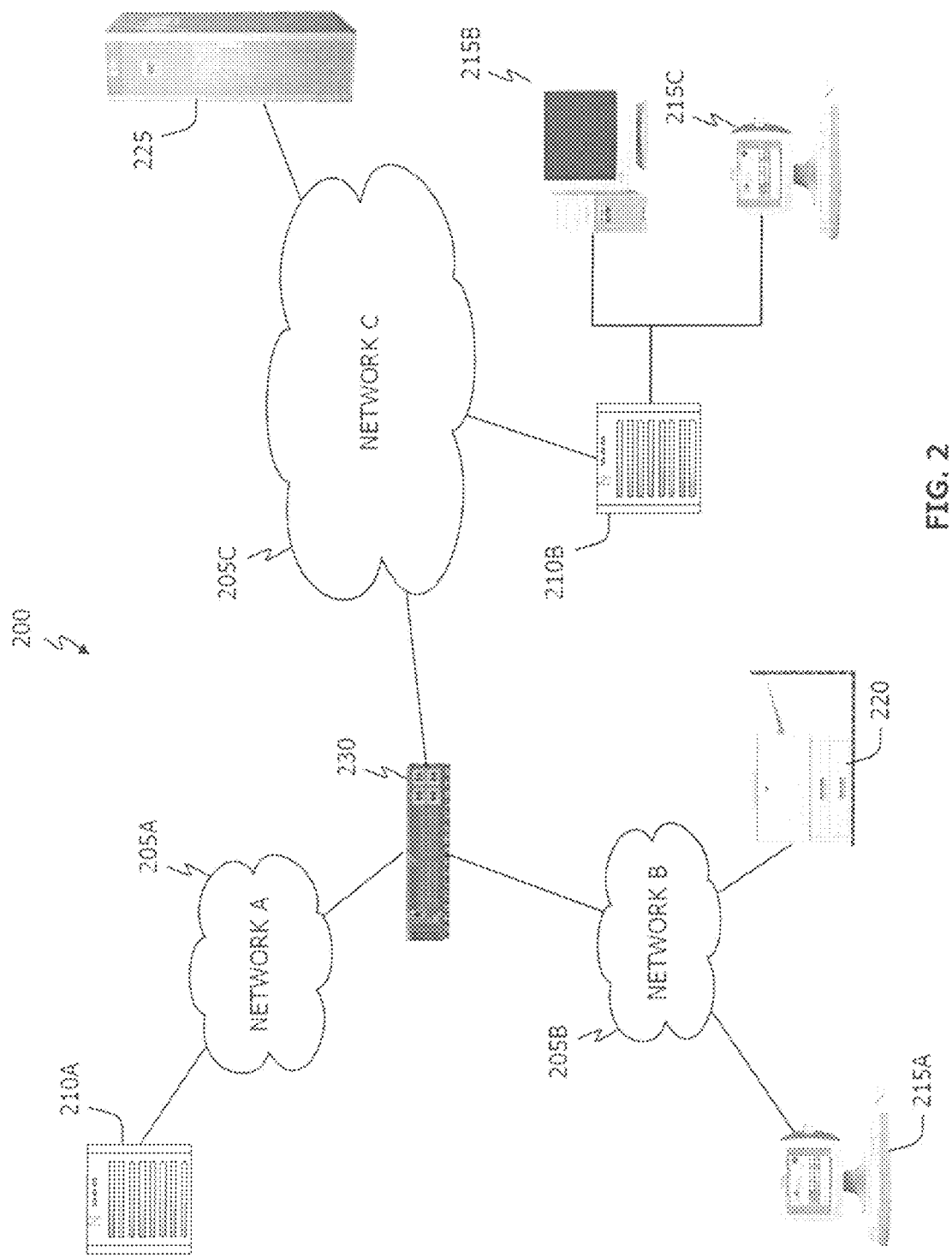
FIG. 2 shows an illustrative network environment associated with embodiments of the invention.

FIG. 2 depicts illustrative network architecture 200, within which the disclosed techniques may be implemented and the disclosed hardware may reside. This illustrative network 200 may include a plurality of networks 205, (i.e., 205A, 205B, and 205C), each of which may take any form including, but not limited to, a local area network (LAN) or a wide area network (WAN), such as the Internet. Further, networks 205 may use any desired technology (wired, wireless, or a combination thereof) and protocol (e.g., transmission control protocol, TCP). Coupled to networks 205 are data server computers 210 (i.e., 210A and 210B) that are capable of operating server applications such as databases and also capable of communicating over networks 205. One embodiment using server computers may involve the operation of one or more central systems to process graphics information and distribute the processed information to nodes on a network.

Client computers 215 (i.e., 215A, 215B, and 215C), which may take the form of any smartphone, gaming system, tablet, computer, set top box, entertainment device/system, television, telephone, communications device, or intelligent machine, including embedded systems, may also be coupled to networks 205, and/or data server computers 210. In some embodiments, network architecture 210 may also include network printers such as printer 220 and storage systems such as 225, which may be used to store multimedia items or other data that are referenced herein. To facilitate communication between different network devices (e.g., data servers 210, end-user computers 215, network printer 220, and storage system 225), at least one gateway or router 230 may be optionally coupled therebetween. Furthermore, in order to facilitate such communication, each device employing the network may comprise a network adapter circuit and related software. For example, if an Ethernet network is desired for communication, each participating device must have an Ethernet adapter or embedded Ethernet-capable ICs. Further, the devices may carry network adapters for any network in which they might participate (including, but not limited to, PANs, LANs, WANs, and cellular networks).

As noted above, embodiments of the inventions disclosed herein include software. As such, a description of common computing software architecture is provided as expressed in a layer diagram in FIG. 3. Like the hardware examples, the software architecture discussed here is not intended to be exclusive in any way, but rather to be illustrative. This is especially true for layer-type diagrams, which software developers tend to express in somewhat differing ways. In this case, the description begins with layers starting with the base hardware layer 395 illustrating hardware, which may include CPUs and GPUs or other processing and/or computer hardware. Above the hardware layer is the O/S kernel layer 390 showing an example as O/S kernel 345, which is kernel software that may perform memory management, device management, and system calls (often the purview of hardware drivers). The notation employed here is generally intended to imply that software elements shown in a layer use resources from the layers below and provide services to layers above. However, in practice, all components of a particular software element may not behave entirely in that manner.

Returning to FIG. 3, layer 385 is the O/S services layer exemplified by O/S services 350. O/S services may provide core O/S functions in a protected environment. In addition, O/S services shown in layer 385 may include frameworks for OpenGL 351, Metal 352, Software Raytracer 353, and a Pure Software Rasterizer 354. These particular examples all relate to graphics and/or graphics libraries and are chosen to illuminate the topic of many embodiments herein, which relate to graphics handling. These particular examples also represent graphics frameworks/libraries that may operate in the lower tier of frameworks, such that developers may use shading and graphics primitives and/or obtain fairly tightly coupled control over the graphics hardware. In addition, the particular examples named in FIG. 3 may also pass their work product on to hardware or hardware drivers.

Referring again to FIG. 3, OpenGL 351 represents an example of a well-known library and application-programming interface for graphics rendering including 2D and 3D graphics. Metal 352 also represents a published graphics library and framework, but it is lower level than OpenGL 351, supporting fine-grained, low-level control of the organization, processing, and submission of graphics and computation commands, as well as the management of associated data and resources for those commands. Software Raytracer 353 is software for creating image information based upon the process of tracing the path of light through pixels in the plane of an image. Pure Software Rasterizer 354 refers generally to software used to make graphics information such as pixels without specialized graphics hardware (e.g., using only the CPU). These libraries or frameworks shown within the O/S services layer 385 are only exemplary and intended to show the general level of the layer and how it relates to other software in a sample arrangement (e.g. kernel operations usually below and higher-level Applications Services 360 usually above). In addition, it may be useful to note that Metal 352 represents a published framework/library of Apple Inc. that is known to developers in the art. Furthermore, OpenGL 351 may represent a framework/library present in current versions of software distributed by Apple Inc.

Above the O/S services layer 385 there is an Application Services layer 380, which includes Sprite Kit 361, Scene Kit 362 Core Animation 363, and Core Graphics 364. The O/S services layer represents higher-level frameworks that are commonly directly accessed by application programs. In some embodiments of this disclosure the O/S services layer includes graphics-related frameworks that are high level in that they are agnostic to the underlying graphics libraries (such as those discussed with respect to layer 385). In such embodiments, these higher-level graphics frameworks are meant to provide developer access to graphics functionality in a more user/developer friendly way and allow developers to avoid work with shading and graphics primitives. By way of example, Sprite Kit 361 is a graphics rendering and animation infrastructure made available by Apple Inc. Sprite Kit 361 may be used to animate textured images or "sprites." Scene Kit 362 is a 3D-rendering framework from Apple Inc. that supports the import, manipulation, and rendering of 3D assets at a higher level than frameworks having similar capabilities, such as OpenGL. Core Animation 363 is a graphics rendering and animation infrastructure made available from Apple Inc. Core Animation 363 may be used to animate views and other visual elements of an application. Core Graphics 364 is a two-dimensional drawing engine from Apple Inc. Core Graphics 365 provides 2D rendering for applications.

Figure 3:
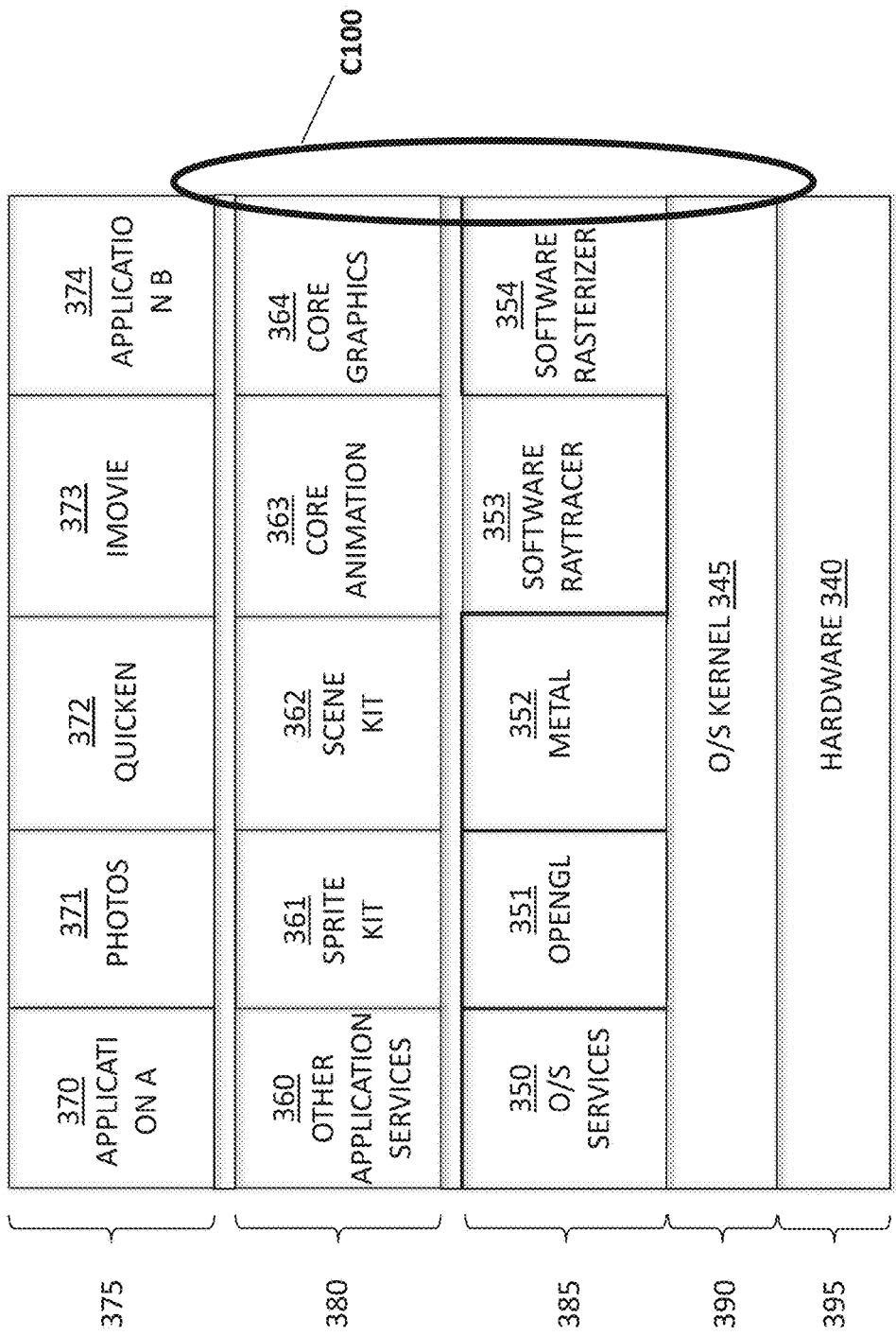
FIG. 3 shows an illustrative software layer and architecture diagram.

Above the application services layer 380, there is the application layer 375, which may comprise any type of application program. By way of example, FIG. 3 shows three specific applications: photos 371 (a photo management, editing, and sharing program), Quicken 372 (a financial management program), and iMovie 373 (a movie making and sharing program). Application layer 375 also shows two generic applications 370 and 374, which represent the presence of any other applications that may interact with or be part of the inventive embodiments disclosed herein. Generally, embodiments of the invention employ and/or interact with applications that produce displayable/viewable content.

In evaluating O/S services layer 385 and applications services layer 380, it may be useful to realize that different frameworks have higher- or lower-level application program interfaces, even if the frameworks are represented in the same layer of the FIG. 3 diagram. The illustration of FIG. 3 serves to provide a general guideline and to introduce exemplary frameworks that may be discussed later. Furthermore, some embodiments of the invention may imply that frameworks in layer 380 make use of the libraries represented in layer 385. Thus, FIG. 3 provides intellectual reinforcement for these examples. Importantly, FIG. 3 is not intended to limit the types of frameworks or libraries that may be used in any particular way or in any particular embodiment. Generally, many embodiments of this disclosure propose software activity and architecture in the layers between the hardware 340 and application 375 layers, shown by C100.

With reference again to FIG. 3, some embodiments may suggest the use of higher-level frameworks, such as those shown in application services layer 380, however, where intelligent analysis is performed on the particular graphics request, specific hardware and/or a specific library or low-level framework may be chosen to process the request. In these embodiments, the intelligent analysis may provide for on-the-fly decision making regarding the best path for the graphics request to follow down to hardware.

Virtualizing Graphics Processing

Referring to FIG. 4A, some embodiments of the disclosure attempt to virtualize graphics processing so that an application 401 need not have knowledge or concern regarding graphics primitives or hardware. In one embodiment, application 401 may use a well-defined programming interface to convey requests for graphics/drawing/display to Graphics VM 402. Graphics VM 402 may refer to hardware and/or software (depending upon the embodiment) that provides a virtualization of the underlying graphics backend to the application layer. In some embodiments, graphics VM 402 may be implemented as a virtual machine although the description and the use of the word virtual and acronym VM are not intended to confine the embodiments to virtual machines. In some embodiments, graphics VM 402 may reduce the application's request for graphics/drawing/display into a form that is suitable for submission to hardware or hardware drivers. In some embodiments, Graphics VM 402 may be aware of some or all of the following: (i) all graphics hardware available, including GPUs and other graphics processors as well as non-graphics-dedicated processors (DSPs, CPUs, etc.); (ii) all shading language libraries available; (iii) the target display device; and, (iv) the nature of the graphics request made by the application program (e.g., the mathematical description of the graphic or the shader program for the graphic). Having this information, Graphics VM 402 may optimize the path of the graphics request to the display element. In some embodiments, the path is optimized on a per graphics request, per drawing request or per shader basis.

In one or more embodiments, based upon the available hardware, display element, and the nature of the requested graphic; VM 402 may choose the most efficient graphics library (from those available) and/or hardware 403 to perform the work or render the requested graphics. In other embodiments, graphics VM 402 may limit consideration to only one or more of the available hardware, the graphics libraries, and the nature of the requested graphic. In yet other embodiments, graphics VM 402 may consider additional factors, such as the loading of available hardware (e.g., CPU loading or GPU loading), the context of the system environment (e.g., lighting on the display element, GPS location, movement of the display system, etc.), other sensor information associated with the display system, user information (e.g., regarding demographics or preferences for viewing displayed information), or power status of the host system or any particular component, such as a CPU or GPU.

Referring now to FIG. 4B, there is shown a representation of embodiments that resemble the system described with respect to FIG. 4A. In particular, FIG. 4B shows, within element grouping 416 (dotted line), an architecture that substitutes for graphics VM 402 of FIG. 4A. Referring to FIG. 4B, a system employing some embodiments of the invention may have any number of high-level graphics frameworks 412, which are generally analogous to application services frameworks previously discussed. A system based upon FIG. 4B may also have any number of graphics libraries or low-level frameworks 414, such as those discussed above with respect to O/S services 350. Virtualization logic 413 may receive application graphics information through one or more high-level frameworks 412, and decide on a path to the target display element based upon the nature of the requested graphics, the available hardware 415 and/or the libraries or low-level frameworks available. In this manner, an on-the-fly decision may be made for each requested graphic so it is routed and processed in the manner most consistent with user desire, most efficient manner, and/or optimal manner for the computing environment. Thus, virtualization logic 413 isolates the application developer from the back end of the graphics system and yields many benefits. For example, since the virtualization logic 413 may be amended as part of O/S or other system updates, the performance of old applications may take advantage of changes to libraries, new libraries, changes to hardware, or new hardware without any editing to the application program (i.e., the virtualization logic 413 can be updated to take advantage of new/changed libraries or hardware, yet still receive the same well-defined input). In addition, application developers can request graphics without any low-level considerations, such as whether vertex or fragment programming will be employed (e.g., the developer need not consider the shading rate because the virtualization logic 413 will optimally choose).

Referring to FIG. 4C, another similar embodiment is shown. In particular, FIG. 4C shows within grouping 426 (dotted line) that a specific application services framework, Sprite Kit 422, may be employed by the application 421 to request a graphic. Virtualization logic 423 may be separately implemented or integrated in Sprite Kit 422 (or any application services framework, such as Scene Kit) and perform the functions as described in the prior embodiments moving the program flow through a low-level framework or library, such as Metal 424 and onto hardware 425. In some embodiments, Metal 424 or another low-level library/framework may be the sole library target of the flow. While this may limit options for paths to the graphics hardware, it may create efficiencies in terms of modularity. For example, if a very low-level framework/library, such as Metal 424 emerges as a common output for high-level graphics frameworks, then virtualized systems may be quickly assembled using Metal 424 (or an analogous low-level framework/library) as the sole input to the hardware stages.

Layer Examples

Referring now to FIG. 5, there is shown a conceptual layer diagram that illustrates many potential embodiments of the disclosure. Application layer 500 shows exemplary applications 501 through 505 that are categorized by their use of underlying application program interfaces. The illustration shows that, during development, a legacy application may have used Sprite Kit 501, Scene Kit 502, Core Animation 503, Core Graphics 504, and/or any application services graphics program interface 505. Therefore, when such applications are executed, they make calls to the application services layer 510 and particularly to the frameworks 511 through 515 corresponding to the employed application program interfaces. Therefore, some embodiments of the invention contemplate a graphics virtualization logic 521 that accepts the output (or an intermediary) from one or more specified application services frameworks. For example, in terms of graphics and shading information, many existing high-level graphics frameworks may produce output in OpenGL 531 or forms of OpenGL such as GLSL ES. Alternatively, graphics virtualization logic 521 may be integrated with the application services frameworks 510. Upon receipt of a request for graphics from the high-level framework, the virtualization logic 521 may be aware of any available underlying graphics libraries (e.g., OpenGL 531, Metal 532, etc.), the requested graphic (e.g., a mathematics or shader program), and any available underlying hardware (e.g. GPUs).

In some embodiments, a received graphics request may be transformed into a universal intermediary form. One purpose of the intermediary form is to allow versatility in the decision of the graphics virtualization logic 521. For example, if there are four possible forms in which a graphics request may be received by the graphics virtualization logic 521 and five possible destinations (e.g., low-level libraries), then there are twenty transformation possibilities that the graphics virtualization logic 521 would have to manage and update based upon changes to the variety of frameworks. However, by first transforming received information into an intermediary form, the transformation tasks can be modularized as discrete logic modules, each responsible for either transforming one language into the intermediary form or transforming the intermediary form into one language. This improves performance as well as the modularity of the software, allowing for easily adding and subtracting new frameworks/libraries and improving overall manageability of the software. As implied by FIG. 6, differing embodiments of the disclosure may place the various transformation modules either within the graphics virtualization logic 521 or as integrated frameworks/libraries.

Referring again to FIG. 5, the graphics virtualization logic 521 may choose a lower-level library and/or hardware (e.g., GPU) for each individual graphics request based upon the exact nature of the request (i.e., what is being requested) and the available resources as discussed above. In addition, some embodiments of the disclosure may make the determination on-the-fly, meaning between the time that the graphics request is generated by the application and the time the resulting graphic is displayed or presented.

Figure 6:
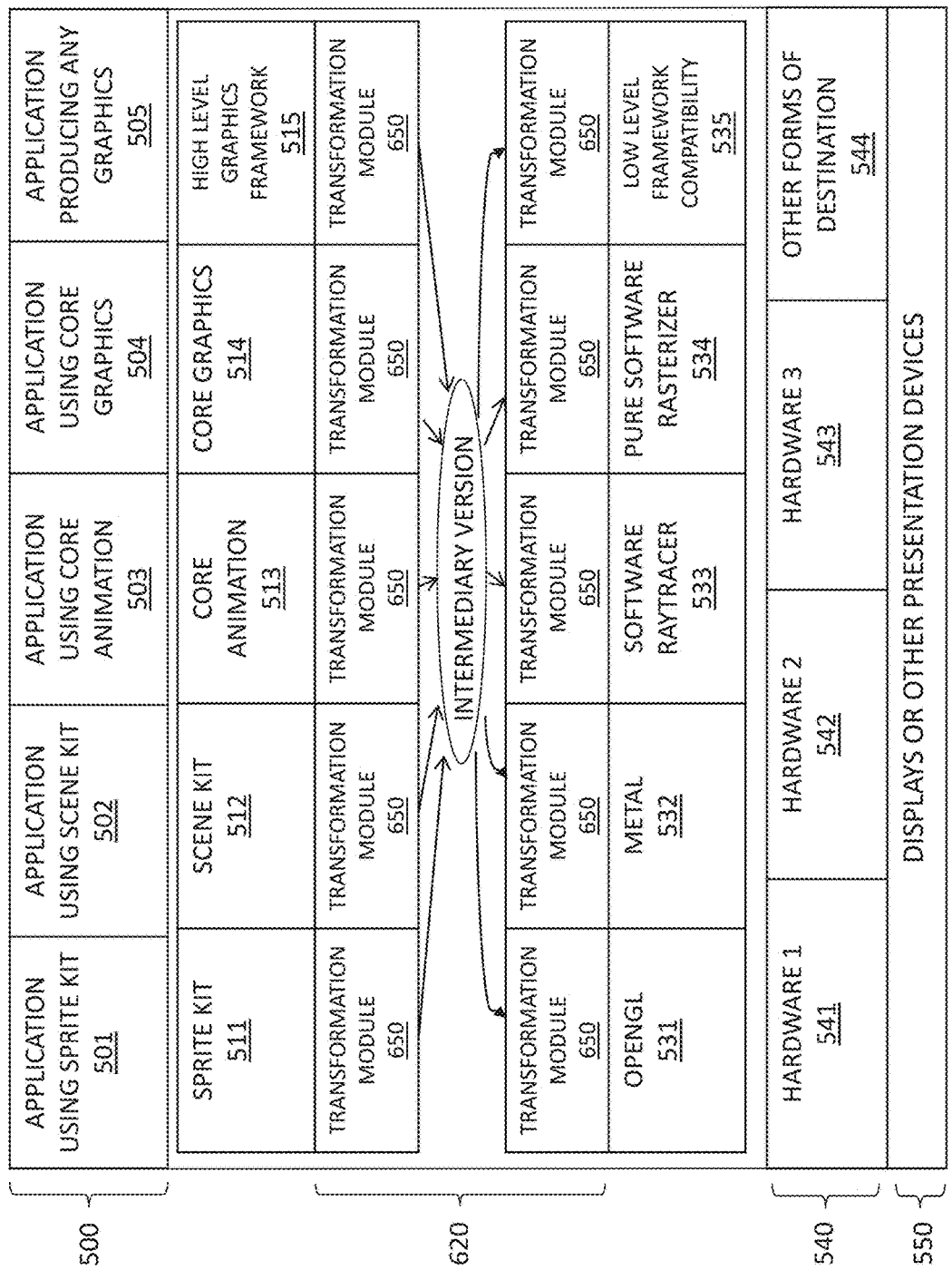
FIG. 6 shows illustrative system architecture.

Referring now to FIG. 6, there is shown a figure that is analogous to FIG. 5, but is intended to illustrate both the optional transformation modules 650 and the ability to incorporate frameworks/libraries with the virtualization logic 620. Various embodiments of the disclosure may integrate one or more high-level frameworks (511 through 515) and low-level libraries (531 through 535). In some embodiments, the graphics virtualization logic 620 may incorporate one or more high-level frameworks and, optionally, corresponding transformation modules, but no low-level libraries. In other embodiments, the graphics virtualization logic 620 may incorporate one or more low-level libraries, but no high-level frameworks. In yet other embodiments, the graphics virtualization logic 620 may incorporate one or more high-level frameworks and one or more low-level libraries and, optionally, the corresponding transformation modules. Whether or not a particular framework or library is incorporated in the graphics virtualization logic 620, unincorporated frameworks and libraries may be employed by the graphics virtualization logic 620 in the same manner as described above and below.

Process Illustrations

Figure 7:
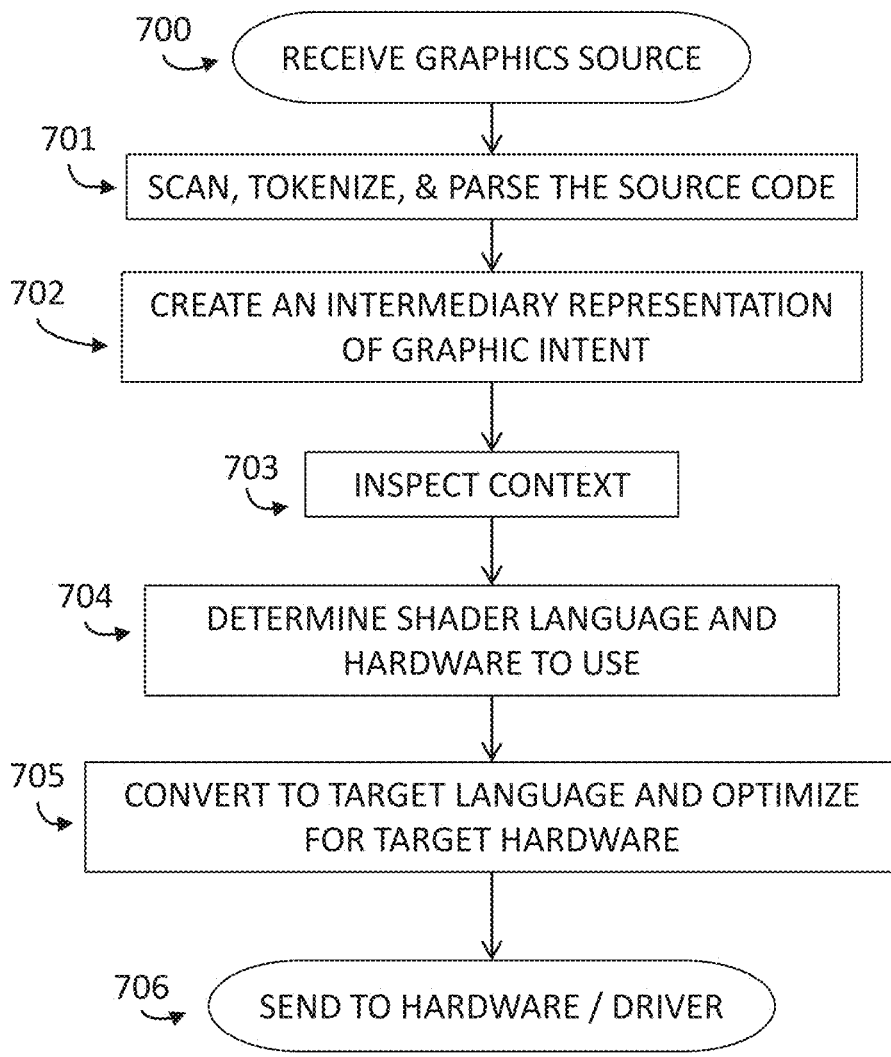
FIG. 7 shows a process associated with some embodiments of the invention.

Referring now to FIG. 7, there is shown a process flow that illustrates numerous embodiments of the disclosure. At 700, a graphics source, which may be any description of a displayable element of graphics, is received. In some embodiments, the graphics source may be a mathematical and/or programmatic representation of a quantum of displayable content, such as a frame. In some other embodiments, the graphics source may be a shader program. At 701, the graphics source may be processed, which may include any number of known or standard operations and optimizations, including one or more of scanning, tokenizing, and parsing the source code. While these concepts are well known in computer science—scanning refers to reading or evaluating each line of code, tokenizing refers to a lexical analysis whereby character sequences are converted to "tokens" (i.e., meaningful character strings), and parsing is a syntactic analysis to analyze a string of symbols conforming to a grammar.

Referring again to FIG. 7, at 702 an intermediary representation of the graphic intent may be created. In some embodiments, the intermediary representation may be expressed in a universal language, such as a universal shader language. The language is universal in that the same intermediary language may be employed regardless of the source application or framework and regardless of the destination library or hardware. The intermediary representation represents the "graphic intent" because it describes the same graphic/drawing/display feature described by the graphic source. In many embodiments, the graphic intent may be captured in a lossless manner, reflecting the identical graphic/drawing/display feature described by the graphics source. At 703, the context may be inspected. In some embodiments, the inspection may involve determining hardware capabilities or alternatives and/or determining available alternatives for low-level frameworks/libraries. For example, if the system has two GPUs, the operational requirements, specifications, and the current state of each may be considered. Furthermore, if OpenGL and Metal are available low-level libraries, the characteristics of those libraries should also be considered. In some embodiments the inspection may also include one or more of the following considerations: expected thermal profile of the host system or any component(s), such as the GPU(s); image quality requirements, such as those imposed or desired by the developer, the user, or the display system; foreground initialization; background initialization; the nature and quantity of hardware rasterizers; software priority in the system (e.g., when an application priority may override a system priority, such as when a game developer wants maximum priority, although generally games cannot exceed a medium-high priority).

In other embodiments, at 703, many other system characteristics may be inspected; such as the nature of the requested graphic, the loading of available hardware (e.g., CPU loading or GPU loading), the context of the system environment (e.g., lighting on the display element, GPS location, movement of the display system, etc.), other sensor information associated with the display system, user information (e.g., regarding demographics or preferences for viewing displayed information), the power status of the host system, or of any component, such as a GPU.

Referring again to FIG. 7, at 704, a determination may be made regarding the target shader language and/or hardware based on the inspection. For, example, an instantiation may result in a decision to use Metal instead of OpenGL and an integrated GPU instead of an accessory (typically high-powered) GPU. The following table provides specific factors and an indication on how those factors may affect the determination. The final determination may consider or weight factors using either empirical data or any number of known mathematical weighting and decision processes.

TABLE I

| Factor | Importance (essential, high, medium, low) | Effect on determination |
|---|---|---|
| Functionality only available on a particular hardware item (e.g., GPU) | Essential | Use the particular hardware item. |
| Functionality only available by using a particular low-level library/framework. | Essential | Use the particular low-level library/framework |
| Functionality performed faster by using a particular low-level library/framework. | High | Use the particular low-level library/framework |
| Functionality performed faster by using a particular hardware item. | High | Use the particular hardware item. |
| Functionality performed faster using a first hardware item and more power-efficiently using a second hardware item. | High | Choose based upon system power setting and/or power state of system at the time of decision |

TABLE I-continued

| Factor | Importance (essential, high, medium, low) | Effect on determination |
| --- | --- | --- |
| Functionality performed faster using a first low-level library/framework item more power-efficiently using a second low-level library/framework | High | Choose based upon system power setting and/or power state of system at the time of decision |
| Use of a first low-level library/framework requires more CPU usage than a second library/framework. | Medium | Choose based upon the system status (usage) of the available GPUs and CPUs. |
| Functionality more power-efficient by using a particular low-level library/framework. | Medium | Use the particular low-level library/framework |
| Functionality more power-efficient by using a particular hardware item. | Medium | Use the particular hardware item. |
| System or component thermal profile | Medium | Use lower power components to reduce heat. |

Referring again to FIG. 7, at 705, the intermediary form may be transformed to the chosen target language/library and any optimizations may performed to optimize the code for the chosen target hardware. Finally, at 706, the produced code may be sent to the hardware driver or directly to the hardware for execution, whichever is appropriate. With respect to whether or not a driver is employed, varying embodiments of the disclosure contemplate using a driver, while other embodiments do not. Generally, drivers are available for commercially-available hardware and may increase the modularity of the system, allowing the easier addition of new modules (e.g., if a driver is available and accepts GLSL ES or Metal, then hardware may be added to the virtualization logic with little effort). However, in some embodiments, efficiencies may be realized by incorporating the driver functionality into the virtualization logic and thereby more tightly coupling the logic with the hardware commands. Ultimately, the decision regarding the use of a driver depends upon the situation, including the available resources required for implementing new hardware, the need for efficiency, and the need for modularity.

Figure 8:
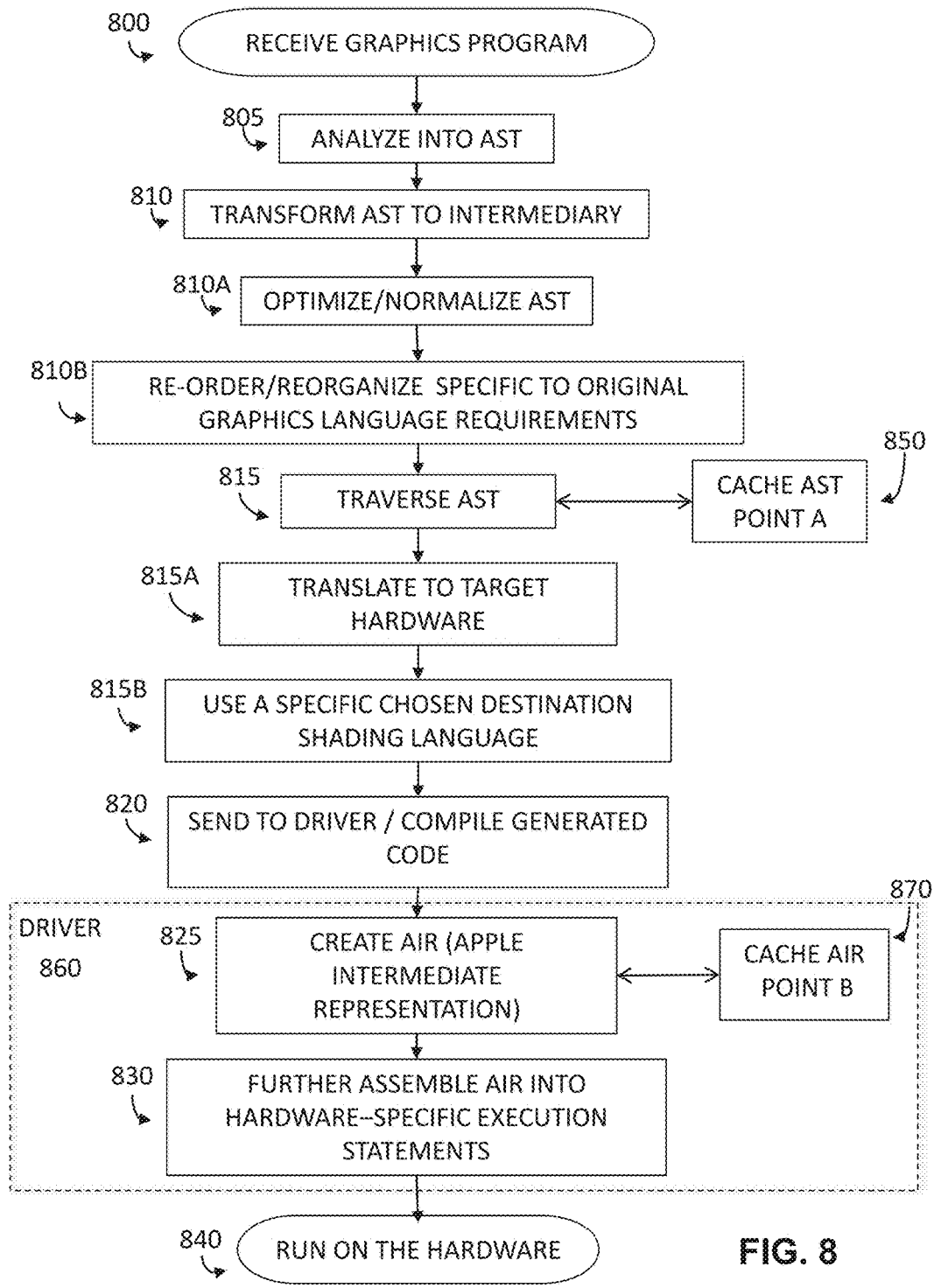
FIG. 8 shows a process associated with some embodiments of the invention.

Referring now to FIG. 8, there is shown another process flow that illustrates numerous embodiments of the disclosure. At 800, a graphics program, which may be any description of a displayable element or graphics, is received. In some embodiments, the graphics program may be a mathematical and/or programmatic representation of a quantum of displayable content, such as a frame. In some embodiments, the graphics program may be a shader program. At 801, the graphics program may be analyzed into an abstract syntax tree ("AST"). ASTs are well-known in computer science and are generally recognized as a tree representation of the abstract syntactic structure of source code. ASTs may also be recognized as an extremely memory-efficient structure to represent a requested graphic. The reference to a tree structure is representative and relates to the conceptual structure of data and not necessarily to a graphical representation of a tree. Thus, at 805, an AST may be created that represents the graphics program in its source programming language.

Referring again to FIG. 8, at 810, the programming language of the AST may be transformed into an intermediary form by manipulation of the AST (i.e., it remains in AST form). In some embodiments, the language transformation may occur prior to the formation of the AST. As implied above, the intermediary form is an intermediary representation of the "graphic intent" of the graphics program. In some embodiments, the intermediary form may be expressed in a universal language, such as a universal shader language. The language/form is universal in that the same intermediary form may be employed regardless of the source application or framework and regardless of the destination library or hardware. In some embodiments, the intermediary form of the AST may expose the "graphic intent" of the graphics program because it may describe the same graphic/drawing/display feature described by the graphics program. In one or more embodiments, the "graphic intent" may be captured in a lossless manner reflecting the identical graphic/drawing/display feature described by the graphics program.

In some embodiments, use of the AST may be important to the ease and efficiency of downstream manipulations. Since the use of an intermediary form may require multiple transformations (from application to hardware), the AST may be employed to simplify the task by limiting the program expression to its abstract syntactic structure. Thus, in some embodiments, the efficiency of using the intermediary form may depend on the use of the AST.

Referring again to FIG. 8, item 810 shows sub-items 810A and 810B, which may be applied in some embodiments. In particular, at 810A, normal AST optimizations and normalization may be applied. Furthermore, at 810B, the AST tree may benefit from re-ordering and re-organization that depends upon artifacts resulting from the source programming language. While these items 810A and 810B are part of some inventive embodiments, the mechanisms for applying these general treatments to an AST are known in the computer science art.

At 815, the AST may be traversed to translate to a target hardware 815A and/or a target library/language 815b. Since, the traversal may be resource intensive, there is an optional caching embodiment that provides for eliminating portions of or all of the traversal work. For example, each time an AST must be traversed, the cache 850 may be queried to determine whether the same traversal operation (or part thereof) has been previously traversed. If the same traversal work has already been performed, the result may be retrieved from the cache and the processing resources for actual traversal may be conserved. Of course, in order to maintain a cache, each time an AST is traversed, a cache tag (usually identifying information) along with the result of the traversal may be stored in the cache unless it has already been stored. The cache may hold as many past traversals as the developer may wish to provide in view of memory and performance considerations. The discrete art of caching is known in the art, but the stage of caching in the disclosed process may be advantageous to embodiments of the invention.

Returning again to 815, the decisions regarding the identity of the target hardware and/or target library may be made according to the manner discussed above and at any time, either before or during or after the AST traversal. In one embodiment, the AST traversal may be iterative and the decisions regarding target hardware and target library may be made during the course of one or more traversals. For example, the decisions regarding target hardware and/or target library may depend upon multiple facets of the AST, such that a balance of factors may be accumulated as the tree is traversed one or more times. In some embodiments, at the end of the process 815, the AST may be translated such that it may be deconstructed into program code for a particular hardware arrangement and a particular library.

At 820, the residual program code may be placed in the final pipeline to the hardware. In a current typical embodiment (but not necessarily in all embodiments), this may involve submission to the hardware driver, which may involve the operation of the system kernel. Depending upon the embodiment, the chosen library may be a direct application to the hardware, in which case no driver would be necessary. More commonly, however, in some embodiments, the driver 860 may further manipulate the low-level library source and create specific execution statements for the hardware 830. Furthermore, in certain embodiments modeled on operating systems from Apple Inc., a second intermediary code form may be produced at 825. This second intermediary form may include the Apple Intermediate Representation ("AIR"). Generally, AIR is a form of graphics code that is optimized for runtime compiling so that AIR may be pre-prepared and still allow for very rapid rendering at runtime.

Similarly to the AST traversal discussed with respect to 815, the driver's work of creating the AIR 825 and further assembling into execution statements 830 may be resource intense. Thus, this represents another stage where there may be benefit from caching, which might be done either at 820 before submission to the driver or at 825 before the driver begins its work. Whether or not a cache is used or a cache hit is found, once the execution statements are prepared, the code may be run on the hardware 840 and the graphics may be rendered.

Dynamic Environment

Many embodiments recognize that a computer system is a dynamic environment where system parameters may change moment to moment, for example the existence and availability of resources. Thus, in some embodiments, the configuration of the graphics pipeline between an application and the screen (as described above) must be reconsidered as system parameters change. In one or more embodiments, reconsideration only applies to graphic requests made after the system parameter change. In other embodiments, an adjustment based upon parameter changes may cause a re-evaluation and/or change of decisions in process (e.g. regarding graphics requests already received and potentially decisions regarding low level libraries and hardware where the requests have not yet been committed). For example, if power is unplugged from a MacBook computer, one embodiment may re-evaluate its choices and re-instantiate shaders and assets in a watt-conserving manner. In addition, in an example of hot-swappable components, such as a hypothetical graphics card that can be added or removed from a running system, a similar re-evaluation may be required when the resource suddenly becomes available or unavailable.

In other embodiments, the system may react to a change in user activities or priorities. In these embodiments, re-instantiation of shaders and assets and/or re-evaluation of the pipeline path may occur in reaction to user-related activity. For example a user may play a game that consumes one hundred percent of relevant system resources. If the user pauses to interact with a video chat application which also requires GPU resources, the game is expected to keep running in a view port. In order to operate the game (which consumes 100% of relevant resources) and the chat application, the game's rendering pipeline may be reconfigured in a minimal state to free previously required resources. Likewise, when focus returns to the game, the game may reclaim the resources.

In yet other embodiments, when a system has multiple graphics hardware options (e.g. a multiplicity of discrete graphics cards or GPUs), the system may determine that graphics load may be balanced between the available graphics systems. In that case, the graphics work may be partitioned between discrete graphics systems, using different parameterizations in each case. In these situations, the final image may be recomposed before presentation according to an algorithm such as sort-first, sort-middle, or sort-last. In some embodiments, this last re-composition stage may involve custom composition hardware.

In these embodiments where the graphics can be partitioned across multiple GPUs, a table may be built of resource GPU affinity, and resources created accordingly. During draw operations, using sort-first, sort-middle, or sort-last algorithm, images portions may be dispatched to GPUs. As available, and according to sort rule, results may be gathered and composited, either on a designated composition GPU, or on specialized composition (i.e. layering) hardware dedicated for this purpose (e.g., in legacy systems, the mouse cursor image was on a hardware composite layer).

The various embodiments of the disclosure contemplate re-evaluation of choices and potential reconfiguration of the pipeline in one or more of the following circumstances: hardware resources become available, for example, due to a hot-swap add; hardware resources are lost; or, hardware availability arises, for example when hardware is relinquished by other software. Some of the reason for hardware availability or unavailability are: hardware becomes unavailable because a process becomes focused process after previous being a background process; hardware becomes unavailable due to hot-swap removal; hardware becomes available/unavailable due to thermal overload or the return of previously overloaded components; hardware becomes available/unavailable due to power (watt) restriction or the release of same; hardware becomes unavailable due to a process becoming a background process; or hardware becomes unavailable due to higher priority request such as certain communications request (e.g. a Facetime call).

It is to be understood that the above description is intended to be illustrative, and not restrictive. The material has been presented to enable any person skilled in the art to make and use the invention as claimed and is provided in the context of particular embodiments, variations of which will be readily apparent to those skilled in the art (e.g., many of the disclosed embodiments may be used in combination with each other). In addition, it will be understood that some of the operations identified herein may be performed in different orders. The scope of the invention, therefore, should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method comprising:
receiving a graphics request expressed in a first graphics source code language and defining a first graphic;
translating the graphics request into a second graphics source code language, the second graphics source code language being a universal language, wherein the universal language is characterized by having compatibility with the first graphics source code language and a plurality of available graphics libraries indicative of a plurality of available graphics application programming interfaces;
representing the graphics request in an Abstract Syntax Tree (AST) that defines the first graphic;
inspecting the AST, wherein inspecting the AST comprises determining the first graphic and identifying available graphics libraries for producing the first graphic;
selecting, at runtime: (i) one of the available graphics libraries to be a target graphics library indicative of a target graphics application programming interface; and (ii) a graphics hardware, wherein the selection of the target graphics library and the graphics hardware is based at least upon: functionality of the target graphics library, functionality of the graphics hardware, and a priority of the graphics request;
translating, using the AST, the second graphics source code language into a third graphics source code language based on the target graphics library; and
sending the graphics request as embodied in the third graphics source code language for execution on the selected graphics hardware.

2. The method of claim 1, wherein the graphics request is a shader program.

3. The method of claim 1, wherein the selected graphics hardware includes a graphics driver.

4. The method of clam 1, wherein the graphics request is represented in the AST prior to translating the graphics request into a second graphics source code language.

5. The method of claim 1, wherein inspecting the AST further comprising performing at least one of the following actions: determining the identity of available hardware items; determining a thermal profile of a system; determining a thermal profile of one or more of the available hardware items; or determining system priorities.

6. The method of claim 5, wherein selecting the graphics hardware further comprises selecting a target hardware item based upon the relationship between the graphics request and the identity of available hardware items.

7. The method of claim 6, wherein the target hardware item is a Graphics Processing Unit (GPU).

8. A non-transitory program storage device, readable by a processor and comprising instructions stored thereon to cause one or more processors to:
receive a graphics request expressed in a first graphics source code language and defining a first graphic;
translate the graphics request into a second graphics source code language, the second graphics source code language being a universal language, wherein the universal language is characterized by having compatibility with the first graphics source code language and a plurality of available graphics libraries indicative of a plurality of available graphics application programming interfaces;
represent the graphics request in an Abstract Syntax Tree (AST) that defines the first graphic;
inspect the AST, wherein the instructions to inspect the AST comprise instructions to determine the first graphic and instructions to identify available graphics libraries for producing the first graphic;
select, at runtime: (i) one of the available graphics libraries to be a target graphics library indicative of a target graphics application programming interface; and (ii) a graphics hardware, wherein the selection of the target graphics library and the graphics hardware is based at least upon: functionality of the target graphics library, functionality of the graphics hardware, and a priority of the graphics request;
translate, using the AST, the second graphics source code language into a third graphics source code language based on the target graphics library; and
send the graphics request as embodied in the third graphics source code language for execution on the selected graphics hardware.

9. The non-transitory program storage device of claim 8, wherein the graphics request is received from an application.

10. The non-transitory program storage device of clam 8, wherein the graphics request is represented in the AST prior to translating the graphics request into the second graphics source code language.

11. The non-transitory program storage device of claim 8, wherein the instructions to inspect the AST further comprise instructions to cause the one or more processors to determine an identity of available hardware items.

12. The non-transitory program storage device of claim 11, wherein the instructions to select the graphics hardware further comprise instructions to cause the one or more processors to select a target hardware item based upon a relationship between the graphics request and the identity of available hardware items.

13. The non-transitory program storage device of claim 12, further comprising instructions stored thereon to cause the one or more processors to:
select a new graphics hardware, based, at least in part, on a detected system parameter change.

14. The non-transitory program storage device of claim 13, wherein the detected system parameter change comprises one or more of the following: an addition of a new hardware item; a deletion of an existing hardware item; a detected availability of a previously unavailable hardware item; a detected unavailability of a previously available hardware item; or a change in priorities.

15. A system comprising:
one or more CPUs;
one or more Graphics Processing Units (GPUs);
a memory for storing program instructions for the one or more CPUs, where certain instructions when executed cause the one or more CPUs to:
receive a graphics request expressed in a first graphics source code language and defining a first graphic;
translate the graphics request into a second graphics source code language, the second graphics source code language being a universal language, wherein the universal language is characterized by having compatibility with the first graphics source code language and a plurality of available graphics libraries for a plurality of available graphics application program interfaces;

represent the graphics request in an Abstract Syntax Tree (AST) that defines the first graphic;

inspect the AST, wherein the instructions to inspect the AST comprise instructions to determine the first graphic and instructions to identify available low-level graphics libraries for producing the first graphic;

select, at runtime: (i) one of the available graphics libraries to be a target graphics library for a target graphics application program interface; and (ii) a graphics hardware, wherein the selection of the target graphics library and the graphics hardware is based at least upon: functionality of the target graphics library, functionality of the graphics hardware, and a priority of the graphics request;

translate, using the AST, the second graphics source code language into a third graphics source code language based on the target shader language that corresponds to the target graphics library; and send the graphics request as embodied in the third graphics source code language for execution statements for execution on the selected graphics hardware.

16. The system of clam 15, wherein the graphics request is represented in the AST prior to translating the graphics request into a second graphics source code language.

17. The system of claim 15, wherein the instructions to inspect the AST further comprise instructions that, when executed also case the one or more CPUs to identify available hardware items.

18. The system of claim 17, wherein the instructions to select the graphics hardware further comprise instructions that, when executed, cause the one or more CPUs to select a target hardware item based upon the relationship between the graphics request and one or more of the identified available hardware items.

19. The system of claim 18, wherein the certain instructions when executed also cause the one or more CPUs to:

select a new graphics hardware, based, at least in part, on a detected system parameter change.

20. The system of claim 19, wherein the detected system parameter change comprises one or more of the following: an addition of a new hardware item; a deletion of an existing hardware item; a detected availability of a previously unavailable hardware item; a detected unavailability of a previously available hardware item; or a change in system priorities.

\* \* \* \* \*